INVENTORS
MILLARD M. BRENNER
SCOTT S. APPLETON
BERNARD LIPPEL
DONALD H. HAMSHER
BY Harry M. Saragovitz
Attorney July 27, 1954 M. M. BRENNER ET AL 2,685,054

SYSTEM FOR CONVERTING ELECTRICAL CODE INTO SHAFT ROTATION

Filed April 3, 1951 3 Sheets-Sheet 2

INVENTOR.
MILLARD M. BRENNER
SCOTT S. APPLETON
BERNARD LIPPEL
DONALD H. HAMSHER

BY Harry M. Saragovitz
Attorney

SYSTEM FOR CONVERTING ELECTRICAL CODE INTO SHAFT ROTATION

Filed April 3, 1951

INVENTORS
MILLARD M. BRENNER
SCOTT S. APPLETON
BERNARD LIPPEL
DONALD H. HAMSHER

BY Harry M. Saragovitz
Attorney

Patented July 27, 1954

2,685,054

UNITED STATES PATENT OFFICE 2,685,054

SYSTEM FOR CONVERTING ELECTRICAL CODE INTO SHAFT ROTATION

Millard M. Brenner and Scott S. Appleton, Belmar, Bernard Lippel, Red Bank, and Donald H. Hamsher, Long Branch, N. J., assignors to the United States of America as represented by the Secretary of the Army Application April 3, 1951, Serial No. 219,101

2 Claims. (Cl. 318—28)

Figures 1, 2:
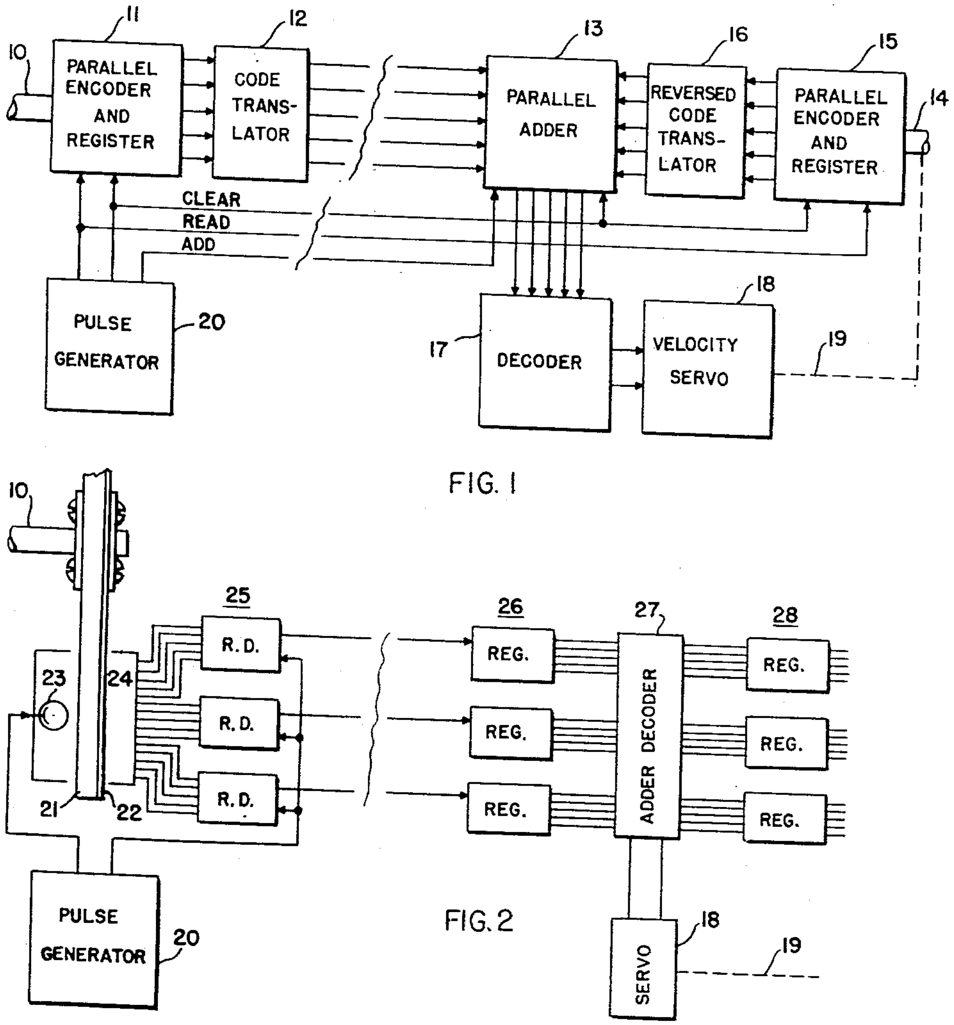

(Granted under Title 35, U. S. Code (1952), sec. 266)

The invention described herein may be manufactured and used by or for the Government for governmental purposes, without the payment of any royalty thereon.

This invention relates to systems for transmitting data in the form of pulse code modulation. In particular, the invention relates to a data transmission system employing a digital servo arrangement for precisely transmitting a coordinate of location such as a shaft rotation. In transmitting data by pulse code modulation, or otherwise, a variety of arrangements have been employed. In general, these arrangements transmit and analogue voltage representing, say, a shaft position which at the receiver must be reproduced in terms of some standard reference voltage. The precision of such systems is inherently low.

It is, accordingly, an object of the present invention to transmit data in the form of pulse code signals in a more precise and accurate way by an arrangement which avoids many of the disadvantages and limitations of prior art arrangements. It is a further object of the present invention to transmit data representing the position of a movable member by generating and transmitting a binary number which quantitatively represents the measured position of the member relative to a reference position. It is a particular object of the present invention to provide a digital servo system having means for producing digital signals of binary code groups, which represent quantized angular positions of an input and an output shaft or member and digitally to add these signals to produce a precise digital error control signal.

In accordance with the present invention, a data transmission system comprises means for generating, transmitting and registering, recurrently at a chosen rate, digit signals of a binary number together with means for generating and registering at the mentioned rate reversed digit signals of a binary number. The numbers represent, respectively, instantaneous positions of an input member and an output member. Means are provided for adding the digit signals to produce digit signals of a binary number, representing the magnitude and sense of the difference of the member positions. Also provided are means for decoding the last mentioned digit signals to produce a control voltage of amplitude and polarity corresponding to the difference. Velocity servo means are provided operatively responsive to the control voltage for moving the output member to minimize the difference.

Also in accordance with the present invention in a data transmission system there is provided a digital servo arrangement comprising means for receiving and registering in parallel recurrently at a chosen rate digital signals of a binary code group and means, synchronous with the rate, for generating and registering in parallel reversed digit signals of the binary code group. The signals of the groups represent respectively quantized angular positions of an input member and an output member. Also, there are provided means for digitally adding the signals to produce digit signals of a binary code group representing the magnitude and the sense of the difference of the member positions together with means for decoding the last mentioned digit signals to produce a potential of amplitude and polarity representing the magnitude and sense of the difference and velocity servo means operatively responsive to the potential for minimizing the difference.

For a better understanding of the invention, together with other and further objects thereof, reference is had to the following description taken in connection with the accompanying drawings and its scope will be pointed out in the appended claims.

Figure 6:
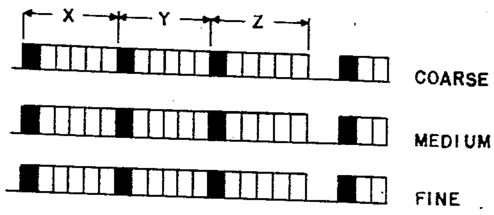
Figure 3:
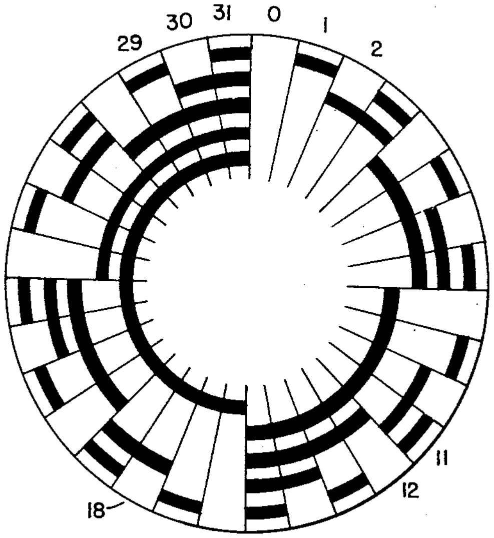
Figure 4:
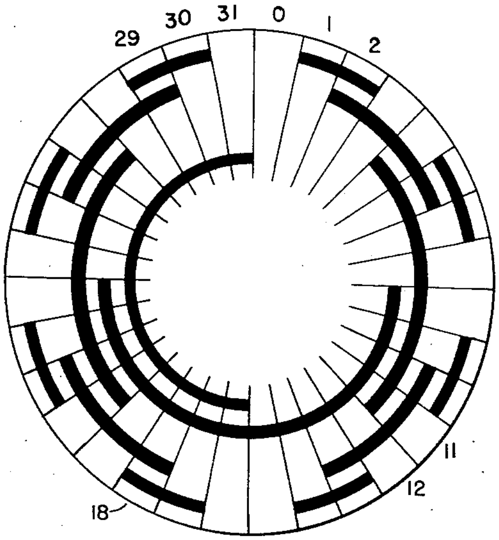
Figure 5:
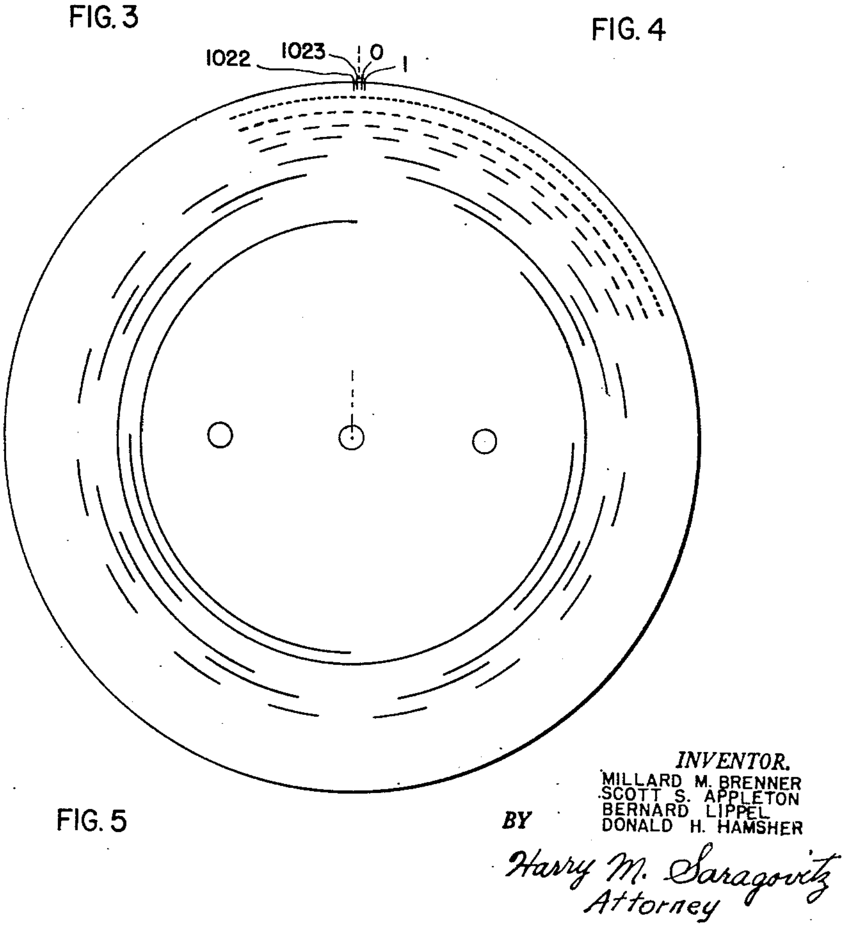
Figure 7:
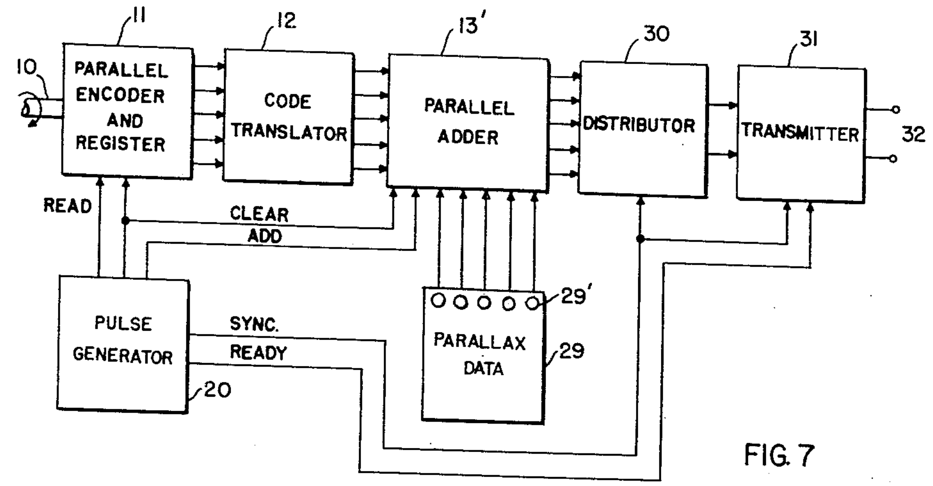
Figure 8:
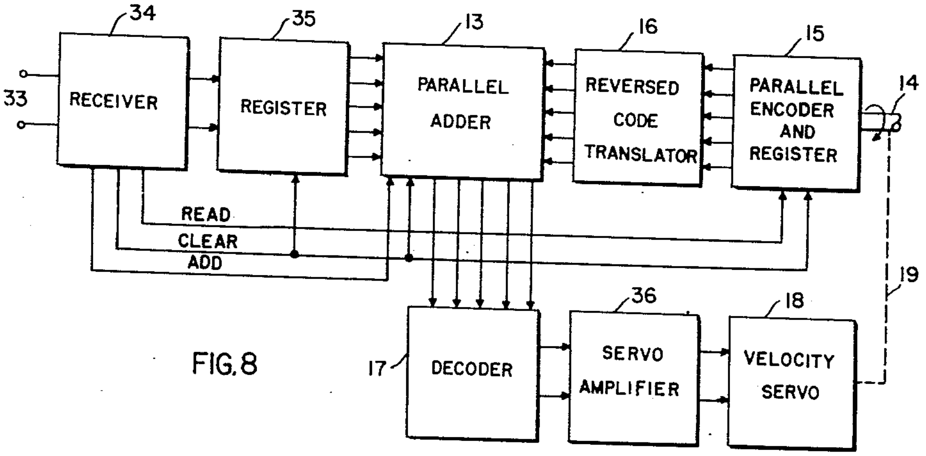
Figure 9:
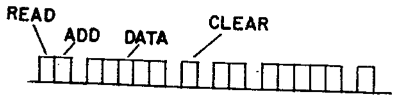
Figure 10:
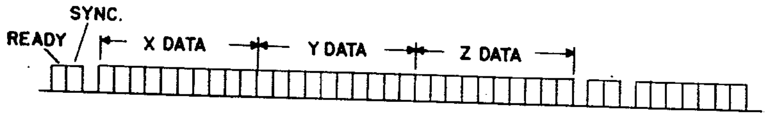

In the drawings, Fig. 1 is a block diagram illustrating the fundamental arrangement and operation of the data transmission system; Fig. 2 is a diagram partly in block and partly schematic, illustrating a parallel encoder and a modified form of the system in accordance with the present invention; Figs. 3 and 4 illustrate, in elementary form, binary code record wheels for the parallel encoding of a shaft position in digit signals of standard binary code and cyclic binary code, respectively; Fig. 5 illustrates a practical form of an encoding record wheel employing 10 digit numbers in cyclic code; Fig. 6 illustrates the method of transmitting data in accordance with the Fig. 2 arrangement; Fig. 7 illustrates in block diagram a code data transmitted in accordance with a preferred arrangement of the invention; Fig. 8 illustrates the receiver for use with the Fig. 7 transmitter; Fig. 9 illustrates a type of pulse code modulation signal transmitted in time multiplex in accordance with the Fig. 1 and Fig. 7 arrangements and Fig. 10 illustrates a preferred time multiplex form of the pulse code modulation signal for a 10 digit service transmitting data for three coordinates of information.

Referring now more particularly to Fig. 1, an input member or shaft 10 is indicated as operating into a parallel encoder and register unit 11, whereby the angular position of the shaft 10 is recurrently sampled. Pulse generator 20 is arranged to generate programing pulses and an output of 20 is coupled to encoder 11. Five parallel outputs from encoder 11, each providing one digit signal of a five digit code group or number (here five digits are used as an illustrative example) are supplied to code translator unit 12. As will be more fully explained, the encoding of the shaft position by unit 11 is preferably in cyclic binary code to give precision in the encoding process and translator 12 translates the digit signals to standard binary code. The five digit output signals from unit 12 are shown as being transmitted by individual circuits to a parallel adder unit 13. The broken lines between units 12 and 13 indicate the transmission path, or paths, which may be very short or very long, as the case may be, and which may include relaying means, such as modulators, radio transmitters, telephone links and such. At the receiving position an output member or shaft 14 is also shown as operating into a parallel encoder and register unit 15, which is similar to the unit 11 employed at the transmitter. The five digit output signals from unit 15, which are preferably in cyclic binary code, are applied by the parallel paths indicated to a reversed code translator unit 16 and the outputs of 16 are also supplied to the parallel adder unit 13. From generator 20 a read pulse is applied via the transmission path to unit 15 and also a delayed add pulse is applied to adder 13 periodically to operate unit 13, after each sampling and registering of the digital data signals by the encoders 11 and 15. A further delayed clear pulse is applied after the operation of addition to clear the registers of stored digit signals. Parallel digital output signal paths from adder 13 are supplied to decoder unit 17 and the output of 17 is coupled to a velocity servo unit 18. Servo 18 is mechanically coupled as indicated by the dash-line 19 to output shaft 14 to rotate that shaft in accordance with the amplitude and polarity of the signal provided by decoder 17.

To explain the operation of the system and of the encoders 11 and 15, reference is made to the code disk or record wheels shown in Figs. 3 and 4. The use and operation of the encoding wheel is also illustrated more completely in connection with Fig. 2, presently to be described. A complete description of a preferred arrangement of the parallel encoder and register unit and the code record wheels is given in application Ser. No. 219,103, entitled "Data Encoder System," filed concurrently with this application in the name of Bernard Lippel et al. and assigned to the same assignee, the Government of the United States. Without now going into the details of preferred circuits and their operation, briefly, a code wheel (which is part of unit 11 and shown in detail in Fig. 2 and Figs. 3 and 4) is mounted on shaft 10 and its angular position is sampled at a periodic rate determined by the pulsing rate of pulse generator 20. Assume for the moment that the code record wheel is for a five digit code and of the form shown in Fig. 3, which is drawn to illustrate the standard binary code. The reference position from which the angle is measured is indicated as the sector labeled zero. The shaft 10 to which the code wheel is attached may be stationary, or rotating rapidly or slowly in either direction and its speed may change or reverse its direction. The black strips may be considered as five rings of commutator segments to which a parallel set of five brushes in radial alignment make contact. The contacts to the segments, whether made or not, depending on the angular position of the shaft, connect to circuits which are all normally open and all are simultaneously and recurrently closed for a short sampling interval at a periodic rate determined by the application of a read pulse from generator 20. In actual practice a photoelectric contact or pickup, as indicated in Fig. 2 and described in the above-mentioned application, is preferred to physical contacting brushes with circuit breakers. In operation, code groups of five digit signals are generated periodically at the read pulse rate of occurrence. The digit signals are generated simultaneously and in parallel channels and in the Fig. 1 illustration are transmitted via the code translator and the five parallel communication paths to the parallel adder unit 13.

For the five digit system of the illustrations, the code wheel provides 32 different discrete or quantized sectors, indicated as sectors 0 to 31. The number of sectors into which the circle is divided is in general $2^n$, where $n$ is the number of digits or rings of commutator segments employed. The rings or digit positions on the wheel are preferably arranged as shown, so that the first or coarsest digit position is the innermost and so on to the highest or finest digit position which is outermost. The digit signals individually produced are two level signals, preferably simply on or off signals which will be arbitrarily referred to as zero, 0, or plus, +, or more generally referred to as binary number digits, 0 or 1. For example if the shaft angle is such that the radially aligned pickup elements fall in the sector eleven, the output digit signals which are simultaneously and repeatedly generated at the periodic rate of the read pulse are 0, +, 0, +, + or in binary number terms 01011. If the shaft rotates so that sector 12 is active, the digit signal output becomes standard binary number 01100.

The five digit signals of the present example quantize or define the shaft position within an angle of $360°/32=11.25°$ which is a relatively coarse determination of the angular position. It is evident, therefore, that a larger number of digit positions will be required for precision operation and that the angular accuracy in degrees will be $360°/2^n$. Thus, a wheel furnishing ten digit code groups, such as is illustrated for cyclic binary code in Fig. 5, provides $360°/2^{10}$ quantized sectors which is $360°/1024$ or equals 0.3515°. A wheel furnishing 15 digits as in Fig. 2, provides precision within a sector of $360°/2^{15}$, which is $360°/32768$ or 0.011°.

As has been stated, the number of brushes or pickup elements of whatever form is employed equals the number of digits in the code group and, for the forms of wheels illustrated, will be aligned along a radius of the wheel. When the number of digits is, for example, ten, then the aligned pickup elements must fall precisely within a sector of 0.3515°. A relative staggering or rotation of the sector rings and their corresponding pickup elements might be resorted to for mechanical convenience of assembly, but without, however, improving on the actual alignment difficulty. Thus it will be clear that with a slight twist in alignment, or with pickup contacts of inadequate fineness, digits of two contiguous sectors may be picked up and so register a completely inaccurate number.

Accordingly, the system uses a code record wheel employing cyclic binary code which is illustrated in Fig. 4 for the five digit system. A wheel so coded, that is, effectively provided with five rings of commutating segments, provides the same number of quantized sector, $2^n$, as the standard binary code wheel, but has the property that the change in digit signals between any two contiguous sectors is never more than one digit. Thus, contiguous sectors eleven and twelve, are written as 01110 and 01010, respectively, in cyclic code and this change of only a single digit obtains for any contiguous sectors of the complete circle. It will be further noted that with the cyclic code the highest position (finest) digit elements extend over two contiguous sectors and hence are more easily constructed in a wheel carrying a large number of digits. Fig. 5 illustrates in part a 10 digit cyclic binary code wheel which has proven satisfactory in practice for photoelectric pickup. The illustration is reduced from actual size, the disc used in practice being 10 inches in diameter. The ring segments for the six lower position digits have been drawn completely, while the four highest position digit rings are shown over only a limited angle for convenience in illustration.

The unit 11 of Fig. 1, therefore, registers at a periodic rate, five digit signals in cyclic binary code. Prior to each reading and registering, the stored digit signals, or more exactly the memory or register, is cleared by a clear pulse from generator 20.

The digit signals generated in cyclic code by unit 11 are produced simultaneously and in parallel channels and so supplied to translator unit 12 which changes them to digit signals in standard binary code. The reason for making this translation is that the cyclic code, while it has specific advantages in the process of encoding data, has on the other hand disadvantages in its employment for other processes, such as addition and decoding. Conversely, the signals in standard binary code may readily be added, decoded and otherwise operated upon.

The apparatus and method of translating from cyclic to standard binary code is illustrated and described in the above-mentioned application and also in the application Ser. No. 219,104, entitled "Digital Decoder," filed concurrently herewith in the names of Bernard Lippel et al., and assigned to the same assignee, the Government of the United States, and therefore, the circuit arrangement will not be illustrated here.

The principle of translation is as follows: Consider translating the number 18 cyclic, which is 11011, to 18 standard, which is 10010. The rule which can be developed for any number is to reverse all digits following a one, and repeat this operation successively. Therefore, we may write this operation as follows:

(a) 18 cyclic=1~~1011~~=

(b) =10~~100~~=

(c) =1001~~1~~=

(d) =10010=18 standard

The presence of a one in the first digit position of (a) required all digits in subsequent positions to be reversed to give (b); the presence of a one in the second position of (a) also required reversal of subsequent position digits to give (c); the presence of a one in the fourth position of (a) required reversal of the subsequent position to give (d); there being no positions subsequent to the fifth, no reversal operation is required for the presence of a one in the fifth position of (a).

The apparatus in translator unit 12 is arranged to perform the described reversals of digit signals simultaneously. Briefly, it consists of a source of D.-C. potential to which are connected in series a number of relay-operated reversing switches, one for each digit position except the last, which need be simply an on or off switch. The input digit signals are applied to operate, each, its appointed relay and an output connection is provided from each switch. Thus a parallel operation of all switches is effected and standard binary digit signals are produced at the output terminals, simultaneously and in parallel, for transmission to the adder unit 13.

The operation of the remaining part of the system is a servo arrangement wherein the position of output shaft 14 is sampled, its position compared with that of input shaft 10 and corrected to agreement therewith. Unit 15 is, accordingly, a parallel encoder and register unit identical with unit 11, operated and cleared by pulses transmitted from unit 20 and, at the sampling rate generates in parallel channels digital signals in cyclic code defining the position of shaft 14. These digit signals are translated to reversed standard binary code, and by an adjustment of one unit in the zero reference position of the code wheel in unit 15, the output digit signal is made the true complement of the binary number position of shaft 14, as will be clear from the following explanation.

Translator unit 16 is identical with unit 12, but is arranged with the D.-C. voltage source so connected to the first switch position as to reverse all digit signals. In binary number terms, if the output digit signals from encoder 15 represents the sector position eleven, then:

11 cyclic=01110 which translated is 11 standard=01011 and reversed is 11 reversed=10100

If, however, the code wheel is shifted on the shaft 10 by one sector (or more conveniently the zero of reference is shifted in regard to apparatus connected to the output shaft 14) so that a lesser number is read; then, for position eleven sector position ten is read and the results are:

10 cyclic=01111 which translated is 10 standard=01010 and reversed is 11 complementary=10101=21 standard

It will be evident, of course, that the sum of 11 standard and 11 complementary is zero, when the binary digits are added. Otherwise stated, they represent the numbers 11+21=32=0 in the case under consideration where the sectors are numbered from 0–31. Thus, by choosing the zero reference position for shaft 14 as diminished by one unit and reversing the digits of the translated output, the complementary standard binary number is obtained and applied as parallel digit signals to adder unit 15.

It will be evident that since the input and output shafts 10 and 14 may be at widely separated points and oriented in any convenient way, the discussion above given relative to off-setting the code wheels on the shaft or shifting the zero of reference by a single unit is entirely academic, since this zero for shaft 14 is in any case arbitrarily chosen. The reversed standard binary signals from unit 26 are, therefore, effectively the complementary number for application to the adder 13.

The purpose of adder unit 13 is to produce digit signals of a standard binary number which is the difference of the binary numbers indicating the positions of shafts 10 and 14. Here a standard type of digital adder is employed and the subtraction accomplished by adding the binary number designating one shaft position to the complementary binary number indicating the other shaft position. Binary adders are well known and described, for example, at a number of places in the book, "High Speed Computing Devices," by Engineering Research Associates, McGraw-Hill Book Company, 1950, such as pages 266 and 267. In the adder the digit signals or input numbers are registered or stored by conditioning conventional multivibrator flip-flop units until actuation by an add pulse registers the sum after which the application of a clear pulse, clears or resets the registers to zero for its next cycle of operation.

Consider two examples of the addition of the standard binary numbers in adder unit 13, which examples will be used also to explain the operation of decoder 17. First assume the output shaft is lagging so that the input shaft number is eleven and the output shaft number is nine. The input shaft is read as eleven, but the output shaft is read as eight. Then the numbers supplied to the adder from the translators will be For the input shaft

01011=11

For the output shaft

10111=8 reversed=23

Therefore, the adder output will be

00010=2 since the sum of 11 plus 23 equals 34, which is 2 in the five digit system.

Next, assume the output shaft is leading so that the input shaft number is eleven and the output shaft number is thirteen. The input shaft is read as eleven, but the output shaft is read as twelve. Accordingly, the numbers supplied to the adder will be For the input shaft

01011=11

For the output shaft

10011=12 reversed=19

Therefore, the adder output will be

11110=30=−2

It will be noted that the number 30 has been called equal to −2. This is for the reason that the decoder 17 is organized to treat all input numbers representing angles of more than 180° as negative numbers and to produce an output error voltage having an amplitude proportional to the magnitude of input difference number and a polarity corresponding to the sign of the input number.

For example, in the five digit system under consideration, numbers 0 through 15 are treated as positive numbers, while numbers 16 through 31 are treated as negative numbers. The decoder 17, its circuits and operation are completely described in patent application Serial No. 219,104, entitled "Digital Decoder," filed concurrently with this application in the name of Bernard Lippel et al., and assigned to the same assignee, the United States Government. Accordingly, reference is made to that application and the present description is restricted to the functions performed.

It will be noted, by reference to the code wheel of Fig. 3 that all sector numbers representing angles of more than 180° are represented in binary code by numbers having a one in the first digit position while for angles less than 180° the first position digit is zero. This is true for both cyclic and standard code regardless of the number of digits employed as evidenced by the code wheels of Figs. 4 and 5. Accordingly, the presence of a one or plus signal in the first digit position at the input to unit 17 operates to reverse the polarity of output voltage and at the same time to utilize the subsequent digit signals as reversed signals. In one arrangement of the circuits of Fig. 17, the true complement of the input number is produced and this arrangement will be assumed here for explaining the operation.

The digit signals present in a standard binary code number have values or weights of $2^{(m-1)}$ where $m$ is the order of the digit. Thus a digit signal in the first position has the highest order and in the illustrative case for a five digit signal the decimal values in order would be 16, 8, 4, 2 and 1. The decimal number corresponding to a given binary number is the sum of the weights or values of the digit signals indicated by the ones in the binary number. The arrangement of decoder 17 is such that a standard reference voltage is divided to produce an output voltage of amplitude and polarity corresponding to the values of the binary number or its complement, whichever is smaller, represented by the digits subsequent to the first position digit. The polarity and use of the number or its complement is determined by the first position digit signal.

Referring back to the examples given for the digital output of adder 13, and further assuming the reference voltage is 32 volts, then, for an adder output of 00010=2 the decoder output is +2 volts; for an adder output of 11110=30 the effective input number is R0001 to which a 1 is added by the circuitry in unit 17, thus making the number R0010=−2 so that the decoder output is −2 volts. Here the letter R is used to indicate the reversal due to the one in the first digit position and it will be noted that the subsequent digits are reversed in comparison with the adder output.

In summary, then, the operation of decoder 17 is such that the first digit of the input signal determines polarity of the output control signal, while the subsequent four-digit binary number or its complement determines the amplitude.

The output of decoder 17 is applied to the input of a velocity servo unit 18, to cause this motor to run at a velocity proportional to its amplitude and in a direction determined by its polarity. Servomotor 18 is coupled to output shaft 14 to rotate it in a direction to diminish its angular difference from input shaft 10.

The data transmission system of Fig. 1 provides advantages over conventional data servo systems which are additional to their known advantages of error signal control and the advantages inherent in pulse code modulation to overcome noise and interference. Certain additional advantages of the present system reside in its flexibility of operation and the greater precision which obtains through the use of both cyclic and standard binary coding, the parallel simultaneous encoding, translation and decoding and the digital comparison of input and output data prior to decoding.

Parallel operation in these processes provides a maximum speed of transmission which can be utilized fully or partially as transmission conditions permit. Thus in Fig.1, where a separate transmission path is provided for each digit signal, each digit is simultaneously generated, translated and decoded in parallel operations and the sampling rate may, accordingly, be increased up to the limit needed for the operations of reading, adding and clearing. When radio transmission is employed the five transmission paths may be obtained through frequency multiplex by providing a different carrier or sub-carrier frequency for each digit signal.

Alternatively, if operation is limited to a single transmission path, then time multiplex may be used by employing distributors to take the digit signals from the memory registers and transmit them serially. This arrangement increases the transmission time interval between reading and adding by an amount necessary to transmit the digits serially. The time sequence of pulse signals for transmitting the digit signals serially is shown in Fig. 9.

Fig. 2 shows an arrangement of the system with a fifteen digit code which illustrates its flexibility. Here the encoding apparatus is diagrammatically indicated by code wheel 21 mounted on shaft 10 and arranged for photoelectric parallel encoding. The wheel 21 is transparent but carries a coating which is opaque except for transparent sectors arranged in fifteen commutating rings in accordance with cyclic binary code. A gas-filled flash lamp 23 is housed within the compartment facing one side of the wheel. The lamp is periodically flashed by read pulses from generator 20 at a chosen periodic rate. The pickup unit for the digital signals, labeled 24, comprises 15 individual photocells (not shown) mounted within a reading head compartment unit. One arrangement of the reading head is shown in detail in the abovementioned application and comprises a slit which limits the transmission of light through the coded disc to within a single sector. This, in the Fig. 2 case of 15 digits, is a narrow sector of 0.011°. The reading head further permits only the light which may pass through an annular space corresponding to a particular ring to reach the corresponding photocell aligned with that ring. Accordingly, during each flash only those photocells which face a transparent ring sector will receive light and produce a digit signal output. The digit signals thus simultaneously produced in parallel correspond to the sampled sector in cyclic binary code. To simplify the explanation the translators for converting to standard primary code have been omitted in this drawing but may be assumed to be included or, instead, the wheel may be assumed to be coded in standard binary code. For the same reason, a showing of the output shaft encoder and translator has been omitted in this drawing. A practical arrangement for utilizing the flexibility of the system is here shown by separating the digit signals into three sub-groups of coarse, medium and fine data signals. Thus the digit signals arising from the first five signal positions, or inner rings, representing the coarse data which defines the angular shaft position to within a sector of 360°/32 or 11.25° (e. g., as in a five digit system) are supplied to a distributor unit 25. Similarly, the digit signals arising from the second five signal positions or middle five rings and which further defines the shaft position to a thirty-second part of the 11.25° arc, or to within a 0.351° arc, are supplied to a second distributor unit 25 and the digit signals arising from the last five signal positions (the outer five rings) and which further define the shaft position to within a thirty-second part of the 0.351° arc, which is 0.011°, are supplied to a third distributor unit 25.

The distributor units 25 operate to transmit digit signals serially, that is in time multiplex, when triggered by a synchronizing pulse from generator 20 and they may be of conventional design such as the arrangement shown in the previously referred to book "High Speed Computing Devices," at page 268, Fig. 13-2*b*.

Three separate transmission paths, which, for example, may be provided by separate wire lines or in the case of radio transmission by frequency multiplex, are indicated so that in effect three independent five digit signal transmission systems are provided. It will be evident that the three paths must be similar or equalized to provide for each path substantially the same transmission time, in order that the three groups of digit signals shall arrive simultaneously at the receiving location. Here, the serially transmitted digits are stored or registered by known means indicated by the three register units 26. These registers may be of conventional design such as the arrangement illustrated in Fig. 13-2*a*, page 268 of the above-mentioned book. Each unit 26 operates to store or register the digit signals received serially and apply these signals in parallel to the adder. Here the adder and decoder are shown as a single block unit 27 corresponding to the two units 13 and 17 of Fig. 1 but adapted to handle 15 digit signals applied in parallel. Thus 15 received digit signals representing the input shaft position and 15 locally generated digit signals representing the output shaft position are simultaneously applied to the adder-decoder unit 27. The decoder output, accordingly, is a voltage of amplitude corresponding to the binary number difference (or its complement) represented by the digit signals subsequent to the first position and of polarity corresponding to the first position digit signal. The output error control voltage is applied to servomotor 18 which, via the mechanical link 19, corrects the output shaft position.

The arrangement is flexible for a variety of service conditions. For example, where high accuracy is not required, transmission circuits may be saved by using only one or two circuits and transmitting only the coarse, or the coarse and medium information. Alternatively, operation of a remote shaft may be required over only a small angle, but with great precision. Under these circumstances only the fine, or the medium and fine, data channels need be employed.

In an arrangement of the system as shown in Fig. 2, but expanded to transmit three coordinates of information as would be required to transmit a location in space, it will be clear that three input shafts and three output shafts will be required; one pair for each coordinate X, Y and Z. In transmitting each of the data, frequency or time multiplex may be employed, depending upon the available transmission channels. Fig. 6 illustrates the case for transmitting the data of three coordinates in time multiplex, which is also frequency multiplexed in accordance with the Fig. 2 arrangement for separate transmission as coarse, medium and fine data, indicated respectively by the diagrams A, B and C. The black intervals are synchronizing pulses for use in directing the X, Y and Z data into separate channels of the receiving location. Each channel provides five time slots for five digit signals code transmission.

The simultaneous parallel data transmission system is also conveniently employed for modifying data to provide corrections for parallax, transmission time and other conditions which arise due to the distance separating the input and output shafts. This is illustrated in Figs. 7 and 8 which represent, respectively, the transmitter and receiver positions of the data transmission system in an arrangement which has proven satisfactory in practice for a ten digit system but here is again illustrated for five digit code. Units similar to those illustrated in Fig. 1 bear similar reference numerals. Thus, the data defining the position of shaft 10 in cyclic binary code is generated by the encoder and register unit 11 and translated to standard binary code by unit 12. The parallel outputs from unit 12 are supplied to a parallel adder 13', so labeled because this unit may be similar to the adder 13 of Fig. 1. Applied to the adder in parallel channels are digit signals from a parallax data storage unit 29. Assuming that the parallax is invariant, then this unit may consist of a plurality of (in this case five) switch positions to provide either an on or off voltage to each output channel. Thus by setting the switches, indicated by push buttons 29' in the unit, any five digit signal can be permanently set up and added in unit 13' to produce an output signal representing the position of shaft 10 as modified by a chosen angle represented by chosen parallax setting. If the modifying angle is to be negative the complementary number will be inserted, effectively to subtract the chosen angle. The sequence of operations is, as before, provided by the timed application of read, add and clear pulses from generator 20. It will be clear that any device furnishing suitable parallax data by switch closures or equivalent electrical signals, may be substituted for the parallax data storage.

The outputs of adder 13' are applied to input positions of a distributor unit 30 (similar in part to units 25 of the Fig. 2 arrangement) so that digit signals are translated serially, in time multiplex, to a transmitter unit 31. The output of 31 is supplied at terminals 32 for translation to the receiver location via wire lines or via an antenna radiator in the case where 31 is a radio transmitter and the digit signals modulate a carrier wave.

The operation of distributor 30 is actuated by a synchronizing pulse from generator 20 so that the time multiplexing of the digit signals occurs in the interval between the add and clear pulses. The operation is, therefore, in the sequence shown in Fig. 9 where the digit signals generated in parallel are distributed serially in the five digit spaces or time slots labeled data. In practice, the read, add and clear pulses will ordinarily not be transmitted but, instead, a synchronizing pulse from which they may be derived by delay circuits in the receiver will be inserted at the transmitter 31 by the connection shown. A so-called ready pulse, also added in the transmitter 31, is employed when the Fig. 7 arrangement is one of three similar units each of which transmits a coordinate of information represented by a shaft position in order to send data representing the position of an object in space. For such operation the time multiplexed data for X, Y and Z coordinates, each in ten digit code, is shown in the time data diagram of Fig. 10. Modification of the circuits for such operation will be clear to those skilled in the art, since it involves only the design of pulse generator 20 to determine the time occurrence of the pulses for operating three similar units to translate their data in a chosen time multiplex sequence. Similar coordination of the operation in three corresponding receiving units will also be required.

The receiving unit for one such coordinate of information is shown in Fig. 8. Here the synchronizing signals and data signals from the transmitter of Fig. 7 are applied at terminals 33 to a receiver 34. Within unit 34 data signals are passed on to a register unit 35, similar to the register units 26 of Fig. 2, while the synchronizing signal is separated and utilized to provide the requisite read, add, and clear pulses. The remainder of the circuit of Fig. 8 is identical with the similar portion of Fig. 1, except that an additional amplifier 36 has been illustrated between the decoder 17 and the velocity servo 18. The amplifier 36 is ordinarily employed to improve the linearity of operation of the servo system.

The invention has been described in a preferred embodiment for an input shaft and an output shaft, but it will be clear that the invention is of equal utility where the input and output members are not rotating shafts but are mechanical members which move in some predetermined path over a predetermined range. For example, the input member may be a mechanical member which moves over a limited range in a straight line and a similar output member is to be controlled so that it follows over a similar or a proportional range. Under these conditions all of the elements of the invention will be arranged to function in a manner similar to that illustrated for rotating shafts.

Referring back to the parallax unit 29 of Fig. 7, this unit may also be conveniently employed in the receiver instead of in the transmitter. For example, the adder 13 of the Fig. 8 receiver may be designed to add three parallel sets of input digit signals. Correction for parallax and transmission time delay can, therefore, conveniently be made in the receiver by adding the correction data at this point. Under certain conditions it may be desirable that both shaft rotations be referred to a third location. For such a condition of operation parallax corrections may be made at both receiver and transmitter. It will be clear that, alternatively, parallax can be added in analogue fashion by displacement of reference indexes at transmitter or receiver.

In general, corrections or modifications can be made digitally or by analogue adjustments. Since the corrections for each coordinate of information amount to an angle modification of the input or the output shaft positions, an analogue modification could be made by a differential coupling between the input shaft and the encoder wheel whereby the relative wheel positions can arbitrarily be shifted by a chosen angle to correct for parallax or transmission time delays which result from the distance separating the two stations. In the present system digital correction is employed since it can be accomplished more expeditiously and precisely and can readily be changed by simply setting up the digital number for the desired angle in unit 29. Mechanical backlash, which may arise in differential gear arrangements when analogue correction is employed, is therefore completely avoided.

It has been stated above that an angular correction may be made for the time delay of transmission by inserting a digital number in the adder of either the transmitter or the receiver, as by means of a parallax unit 29. Similarly, units may be provided which supply to the adder digit numbers which change in accordance with the rate of change of the input shaft. Such a unit would be actuated by a device (not shown) which measures the rate of change of the input data at some point in the system and produces digit signals corresponding to the rate. With such added correction data the output shaft may be made to agree at all times with the position of the input shaft except for moments of acceleration of the input shaft.

While there has been described what is at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a data transmission system, a digital servo arrangement comprising a transmitting and a receiving station, means at each station for generating, in parallel channels and recurrently at a chosen rate, digital code group signals in cyclic binary number code, the groups generated at said stations representing respectively the quantized angular position of an input member and the quantized angular position of an output member relative to a reference position, means for simultaneously translating in parallel channels said digit signals representing said input member to corresponding digital code group signals in standard binary code, means for simultaneously translating in parallel channels said digit signals representing said output member to corresponding digital code group signals in reversed standard binary code, parallel operating means for adding said translated digit signals to produce digital code group signals in standard binary code which represent the magnitude and the sense of the difference of said member positions, means for parallel decoding said last mentioned digit signals to produce a potential of amplitude and polarity which represents the magnitude and sense of said differences and velocity servo means operatively responsive to said potential for adjusting said output member to minimize said difference.

2. In a data transmission system, a digital servo arrangement comprising a transmitting and a receiving station, means at each station for generating in parallel channels and recurrently at a chosen rate, digital code group signals in standard binary number code, the groups generated at said stations representing respectively the quantized angular position of an input member and an output member relative to a reference position, parallel operating means for adding said digit signals to produce digital code group signals in standard binary code which represent the magnitude and the sense of the difference of said member positions, means for parallel decoding said last mentioned digit signals to produce a potential of amplitude and polarity which represents the magnitude and sense of said differences and velocity servo means operatively responsive to said potential for adjusting said output member to minimize said difference.

References Cited in the file of this patent

UNITED STATES PATENTS

| Number | Name | Date |
|---|---|---|
| 2,397,604 | Hartley et al. | Apr. 2, 1946 |
| 2,436,178 | Rajchman | Feb. 17, 1948 |
| 2,533,242 | Gridley | Dec. 12, 1950 |
| 2,537,427 | Seid et al. | Jan. 9, 1951 |
| 2,557,581 | Triman | June 19, 1951 |
| 2,575,956 | Hereford, Jr., et al. | Nov. 20, 1951 |
| 2,630,481 | Johnson | Mar. 3, 1953 |
| 2,630,552 | Johnson | Mar. 3, 1953 |
| 2,643,355 | Hallman, Jr. | June 23, 1953 |